(12) United States Patent
Yoshida

(10) Patent No.: US 8,110,276 B2
(45) Date of Patent: *Feb. 7, 2012

(54) LIGHT DIFFUSION SHEET AND BACKLIGHT UNIT USING THE SAME

(76) Inventor: Minoru Yoshida, Motosu (JP)

( * ) Notice: Subject to any disclaimer, the term of this patent is extended or adjusted under 35 U.S.C. 154(b) by 400 days.

This patent is subject to a terminal disclaimer.

(21) Appl. No.: 11/546,139

(22) Filed: Oct. 11, 2006

(65) Prior Publication Data

US 2007/0087167 A1    Apr. 19, 2007

(30) Foreign Application Priority Data

Oct. 14, 2005   (JP) .................................. 2005-299757

(51) Int. Cl.
*E01F 9/04* (2006.01)
(52) U.S. Cl. ......... 428/134; 428/141; 428/143; 428/212
(58) Field of Classification Search .................. 428/134, 428/141, 143, 212

See application file for complete search history.

(56) References Cited

U.S. PATENT DOCUMENTS

| 5,706,134 | A  | * | 1/1998 | Konno et al. ................. | 359/599 |
| 6,602,596 | B2 | * | 8/2003 | Kimura et al. ................ | 428/327 |
| 6,852,396 | B1 | * | 2/2005 | Mineo ........................... | 428/212 |
| 7,031,061 | B2 | * | 4/2006 | Ito ................................ | 359/599 |
| 2004/0184154 | A1 | | 9/2004 | Ito | |

FOREIGN PATENT DOCUMENTS

| JP | 07-005305 | 1/1995 |
| JP | 7-218705 | 8/1995 |
| JP | 2000-089007 | 3/2000 |
| JP | 2001-324609 | 11/2001 |
| JP | 2002-099220 | 4/2002 |
| JP | 2003-057415 | 2/2003 |
| JP | 2003-329812 | 11/2003 |
| JP | 2004-026974 | 1/2004 |
| JP | 2004-198743 | 7/2004 |
| JP | 2005-107553 | 4/2005 |
| KR | 2001-0072479 | 7/2001 |
| WO | WO-2005/052677 | 6/2005 |

* cited by examiner

*Primary Examiner* — Brent Ohern
(74) *Attorney, Agent, or Firm* — Jordan and Hamburg LLP

(57) ABSTRACT

An object of the present invention is to provide a light diffusion sheet having a favorable cost reduction capability due to excellent scratching preventive property of the front face, and having in addition thereto, a favorable directional light diffusion function, transmittivity of rays of light, and a thin film character; and a backlight unit capable of promoting performances such as luminance as well as price reduction, and thin and light modeling capability. The light diffusion sheet of the present invention has a light diffusion sheet including a transparent substrate layer, and a light diffusion layer overlaid on the front face side of the substrate layer, wherein the light diffusion layer has resin beads and a resin binder, characterized in that the light diffusion layer has protruding parts having a shape of a partial spherical body on the front face in a scattering manner. It is preferred that mean height of the protruding parts be 1 μm or greater and 10 μm or less, mean diameter of the protruding parts be 4 μm or greater and 18 μm or less, mean occupancy rate of the protruding parts be 2% or greater and 20% or less, and surface roughness (Ra) of the light diffusion layer be 1.5 μm or greater and 10 μm or less. As the beads, small monodisperse beads as a principal component, and large beads as a sub component may be included.

5 Claims, 3 Drawing Sheets (a) Light Diffusion Sheet of Example 3

Magnified Photograph of Surface

Magnified Photograph of Cross Section 1,000-fold 3,000-fold (b) Light Diffusion Sheet of Comparative Example Magnified Photograph of Surface Magnified Photograph of Cross Section 1,000-fold 3,000-fold

LIGHT DIFFUSION SHEET AND BACKLIGHT UNIT USING THE SAME

BACKGROUND OF THE INVENTION

1. Field of the Invention

The present invention relates to light diffusion sheets which have directional light diffusion function to allow transmitted rays of light to diffuse while collecting to a side in a normal direction and which are particularly suitable for a backlight of a liquid crystal display device, and backlight units in which the light diffusion sheet is used.

2. Description of the Related Art

Liquid crystal display devices in widespread use have included a backlight system in which light emission is executed by irradiating onto a liquid crystal layer from the back face. In such a type of display devices, a backlight unit which is an edge light type, an immediate beneath type or the like is provided to an under face side of the liquid crystal layer. Such a backlight unit 50 of an edge light type is equipped with a rod-shaped lamp 51 for use as a light source, an optical waveguide plate 52 having a square plate shape disposed so that the edge thereof abuts along the lamp 51, a light diffusion sheet 53 disposed to the front face side of the optical waveguide plate 52, and a prism sheet 54 disposed to the front face side of the light diffusion sheet 53, as fundamentally shown in FIG. 4A.

Referring to functions of this backlight unit 50, rays of incident light from the lamp 51 to the optical waveguide plate 52 are first reflected on reflection dots or a reflection sheet (not shown in the Figure) of the back face of the waveguide plate 52, and exit from the front face of the waveguide plate 52. The rays of light exited from the waveguide plate 52 enter into the light diffusion sheet 53, then are diffused by the light diffusion sheet 53 and exit from the front face of the light diffusion sheet 53. Thereafter, the rays of light exited from the light diffusion sheet 53 enter into the prism sheet 54, and exit as rays of light having a distribution representing a peak in a direction along a substantially normal line via a prism part 54a formed on the front face of the prism sheet 54.

Accordingly, the rays of light exited from the lamp 51 are diffused by the light diffusion sheet 53, and refracted by the prism sheet 54 so that they represent a peak in a direction along the substantially normal line, and illuminate the entire face of the liquid crystal layer on the front face side (not shown in the Figure). Meanwhile, although not shown in the Figure, a light diffusion sheet may be further disposed to the front face side of the prism sheet 54 for the purpose of: relaxation of light condensing properties of the prism sheet 54 as described above; protection of the prism part 54a; or prevention of the sticking between the prism sheet 54 and the liquid crystal panel such as a polarization plate.

The light diffusion sheet 53 to be disposed to the backlight unit 50 generally has a transparent substrate layer 56 made of a synthetic resin, and a light diffusion layer 57 overlaid on the front face of the substrate layer 56 as shown in FIG. 4B (for example, see, JP-A Nos. H07-5305 and 2000-89007). In general, this light diffusion layer 57 includes resin beads 59 in a transparent resin binder 58, and the beads 59 exert the light diffusion function.

In recent years, characteristics desired for LCD vary depending on their applications, but may include (a) heightening of luminance, (b) widening of viewing angle, (c) energy saving, (d) thin and light modeling, (e) price reduction (economical efficiency) capabilities and the like. Particularly, at present, not only optical functions such as heightening of luminance, widening of viewing angle and the like, but also social needs such as price reduction, thin and light modeling capability, and the like have been increasing.

On the other hand, according to the conventional light diffusion sheet 53, means for increasing the amount of incorporated beads 59 and amount of the overlaid light diffusion layer 57 are generally believed to be appropriate as means for improving light diffusibility, however, such increase in amount of incorporating the beads 59 and amount of the overlaid light diffusion layer 57 may lead to difficulties in coating and decrease in transmittance of rays of light. Hence, taking into account of balance among light diffusibility, transmittivity of rays of light and coating facility, the conventional general light diffusion sheet 53 employs as the beads 59, polydisperse beads that have comparatively large mean particle size of approximately 20 µm, and have comparatively broad distribution of the particle size while having the weight ratio of the beads 59 to the binder of approximately 1 and the amount of the overlaid light diffusion layer 57 of 15 to 20 g/m$^2$.

However, the aforementioned conventional light diffusion sheet 53 is formed such that hemispherical protruding parts are comparatively adjacent to the front face of the light diffusion layer 57 owing to the particle size distribution, mean particle size and amount of the beads 59. Therefore, continuous scratches may be generated on the front face of the light diffusion layer 57 in steps of producing the light diffusion sheet 53 and assembly of LCD, whereby reduction of process yield of the product may be caused. Such reduction of process yield of the product of the light diffusion sheet 53 shall be contrary to needs for price reduction of the LCD.

SUMMARY OF THE INVENTION

The present invention was accomplished taking into account of such disadvantages. An object of the present invention is to provide a light diffusion sheet having a satisfactory cost reduction capability due to high scratching preventive property of the front face, as well as a favorable directional light diffusion function, transmittivity of rays of light and a thin film character, and a backlight unit in which performances such as luminance as well as price reduction, and thin and light modeling capability are promoted.

The invention accomplished in order to solve the problems described above is directed to a light diffusion sheet comprising a transparent substrate layer, and a light diffusion layer overlaid on the front face side of this substrate layer, wherein this light diffusion layer has resin beads and a resin binder, and the light diffusion layer has protruding parts having a shape of a partial spherical body on the front face in a scattering manner.

Because the light diffusion sheet has the protruding parts having a shape of a partial spherical body on the front face of the light diffusion layer in a scattering manner, possibility of scratching of the front face is reduced, and generation of a continuous scratch can be prevented even though the front face is scratched (hereinafter, this effect is referred to as "scratching preventive property"). Hence, according to the light diffusion sheet, generation of the continuous scratch on the front face can be reduced in the steps of the production and assembly of LCD, whereby reduction of the process yield of the product can be prevented.

It is preferred that mean height of the protruding parts be 1 µm or greater and 10 µm or less, mean diameter of the protruding parts be 4 µm or greater and 18 µm or less, mean occupancy rate of the protruding parts be 2% or greater and 20% or less, and surface roughness (Ra) of the light diffusion layer achieved by providing the protruding parts on the front face in a scattering manner be 1.5 μm or greater and 10 μm or less. By thus defining the mean height of the protruding parts, mean diameter of the protruding parts, mean occupancy rate of the protruding parts and surface roughness (Ra) of the light diffusion layer to fall within the above range, the aforementioned scratching preventive property of the light diffusion sheet front face can be promoted without deteriorating the optical functions such as light diffusibility exhibited by the light diffusion layer.

The beads which may be included are small monodisperse beads (monodisperse beads having a small diameter) as a principal component, and large beads having a mean particle size greater than the small monodisperse beads (beads having a large diameter) as a sub component. By such use of the small monodisperse beads as a principal component of the beads, the light diffusion sheet can have optical functions such as a favorable directional light diffusion function, transmittivity of rays of light and the like, and economical efficiency, thin film character, coating facility and the like may be promoted. In addition, by including the large beads having a mean particle size greater than the small monodisperse beads, as a sub component of the beads, the protruding parts having a shape of a partial spherical body can be formed on the light diffusion layer front face of the light diffusion sheet in a scattering manner, whereby the aforementioned scratching preventive property can be sufficiently achieved.

It is preferred that mean particle size of the small monodisperse beads be 1.5 μm or greater and 5 μm or less, weight ratio of the beads to the binder be 2.5 or greater and 3 or less, and amount of the overlaid light diffusion layer be 3 g/m$^2$ or greater and 10 g/m$^2$ or less. By thus controlling the mean particle size of the small monodisperse beads to be comparatively small as in the aforementioned range, controlling the weight ratio of the beads to the binder to be comparatively large and controlling the amount of the overlaid light diffusion layer to be comparatively small in such a manner, the small monodisperse beads having a uniform particle size as the principal component can be laid to spread over the substrate layer front face in a comparatively compact and uniform manner. Consequently, optical functions such as the directional light diffusion function, transmittivity of rays of light and the like of the light diffusion sheet are improved, and the economical efficiency, thin film character and coating facility may be promoted.

It is preferred that mean particle size of the large beads be 3 μm or greater and 15 μm or less, and weight ratio of the small monodisperse beads to the large beads be 6/4 or greater and 9/1 or less. By thus defining the mean particle size of the large beads, and the weight ratio of the small monodisperse beads to the large beads to fall within the above range, the mean height of the protruding parts, the mean diameter of the protruding parts, the mean occupancy rate of the protruding parts and the surface roughness (Ra) of the light diffusion layer can be controlled to fall within the above range, whereby the scratching preventive property of the light diffusion sheet can be promoted.

Monodisperse beads can be used as the aforementioned large beads. Such use of the monodisperse beads as the large beads enables reduction of the amount of the large beads for forming the protruding parts on the light diffusion layer front face, and thus factors which may affect the optical functions such as light diffusibility exhibited by the light diffusion layer can be minimized.

Coefficient of variation of particle size distribution of the monodisperse beads is preferably equal to or less than 0.2. Use of the monodisperse beads having a coefficient of variation of particle size distribution of equal to or less than 0.2 as the small monodisperse beads in this manner may efficaciously promote the directional light diffusion function and transmittivity of rays of light exhibited by the light diffusion layer, and facility in forming the light diffusion layer having a great weight ratio of the beads and a small amount of overlay as described above can be promoted efficaciously. Additionally, use of the monodisperse beads having a coefficient of variation of particle size distribution of equal to or less than 0.2 as the large beads enables the light diffusion sheet to have the scratching preventive property sufficiently.

As the substrate polymer of the aforementioned beads and binder, an acrylic resin may be used. Use of an acrylic resin as a main material for the beads and binder in this manner enables the aforementioned directional light diffusion function and transmittivity of rays of light to be further promoted.

It is preferred that a sticking preventive layer overlaid on the back face side of the aforementioned substrate layer be further included, wherein this sticking preventive layer may have beads dispersed in a binder. By thus having a sticking preventive layer on the back face, occurrence of interference fringe owing to sticking between the light diffusion sheet and the optical waveguide plate, the prism sheet and the like disposed on the back face side thereof can be prevented.

Therefore, in backlight units for liquid crystal display devices that allow rays of light emitted from a lamp to disperse and to lead to the front face side, when the aforementioned light diffusion sheet is provided, the cost reduction, and thin and light modeling capability which have been presently desired in social aspects can be promoted because the light diffusion sheet has an excellent scratching preventive property, economical efficiency and thin film character as described above. Also, because the light diffusion sheet in the backlight unit has excellent directional diffusion function and transmittivity of rays of light as described above, lack in uniformity of the luminance can be reduced while the face luminance can be improved.

Herein, the "shape of a partial spherical body" means a shape like a part of a spherical body. The spherical body falls into the category which may include e.g., spheroid, polyhedron and the like, but not limited to a perfect spherical body. The term "mean height of the protruding parts" means an average height of protruding parts measured with respect to a face of an average height in the region without having any protruding parts of the light diffusion layer front face, as a base level. The "mean diameter of the protruding parts" means an average value of the width in the front face shape of the protruding part as measured in predetermined two-or-thogonal directions. The "mean occupancy rate of the protruding parts" means an average value of area ratio occupied by the protruding parts in the light diffusion layer front face. The "mean particle size" and the "coefficient of variation" are values represented on the basis of the volume.

As explained in the foregoing, the light diffusion sheet of the present invention has a favorable cost reduction capability due to excellent scratching preventive property of the front face, and has in addition thereto, a favorable directional light diffusion function, transmittivity of rays of light, and a thin film character. Also, according to the backlight unit of the present invention, price reduction, and thin and light modeling capability can be promoted, and optical performances such as luminance, uniformity of the luminance and the like can be improved.

DESCRIPTION OF THE PREFERRED EMBODIMENTS

Embodiments of the present invention will be described in detail below with reference to the figures ad libitum.

Figure 1:
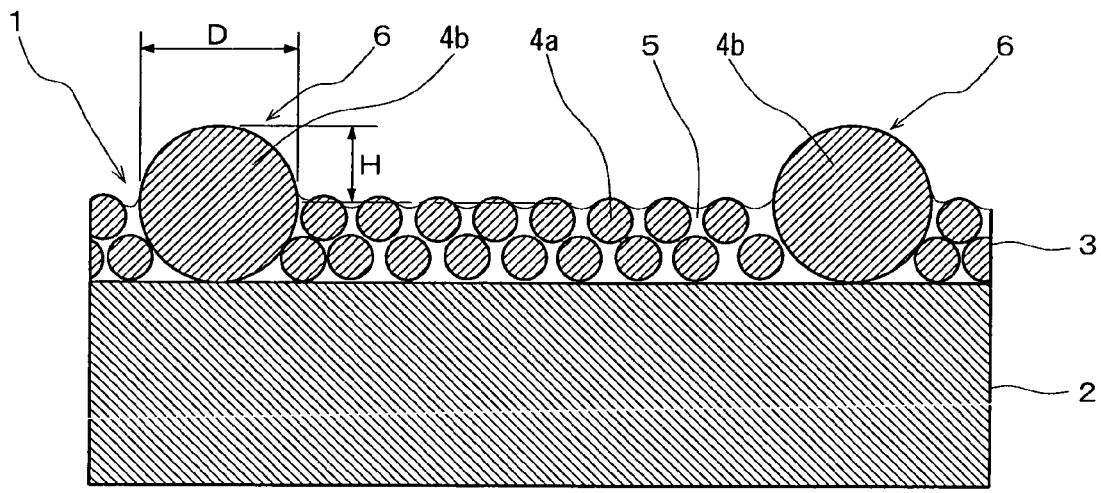
FIG. 1 shows a schematic cross sectional view illustrating a light diffusion sheet according to one embodiment of the present invention.

A light diffusion sheet 1 shown in FIG. 1 comprises a substrate layer 2, and a light diffusion layer 3 overlaid on the front face of this substrate layer 2.

The substrate layer 2 is formed from a transparent, particularly, colorless and transparent synthetic resin, because transmission of rays; of light is required. The synthetic resin which may be used for the substrate layer 2 is not particularly limited, but examples thereof include e.g., polyethylene terephthalate, polyethylene naphthalate, acrylic resins, polycarbonate, polystyrene, polyolefin, cellulose acetate, weather resistant vinyl chloride, and the like. Among them, polyethylene terephthalate having excellent transparency and high strength is preferred, and polyethylene terephthalate with improved deflection property is particularly preferred.

Although the thickness of the substrate layer 2 (mean thickness) is not particularly limited, it may be preferably 10 μm or greater and 250 μm or less, and particularly preferably 20 μm or greater and 188 μm or less. When the thickness of the substrate layer 2 is less then the above range, disadvantages are raised such as liability to occurrence of curling upon coating of the polymer composition for forming the light diffusion layer 3, and difficulties in handling thereof. To the contrary, when the thickness of the substrate layer 2 is greater than the above range, luminance of a liquid crystal display device may be lowered, and the thickness of a backlight unit becomes so great that a result that is adverse to demands for thin and light modeling of a liquid crystal display device may be also effected.

The light diffusion layer 3 comprises beads 4 laid to spread over the front face of the substrate layer 2 in a substantially uniform and compact manner, and a binder 5 that fixes the beads 4. Such beads 4 are covered by the binder 5. The beads 4 included in the light diffusion layer 3 in such a manner enable uniform diffusion of rays of light which transmit the light diffusion layer 3 from the back side to the front side. Moreover, fine protrusions are formed on the surface of the light diffusion layer 3 in a substantially uniform and substantially compact manner. Owing to a refracting action of the fine recessions and protrusions like a lens thus formed on the front face of the light diffusion sheet 1, the rays of light can be more efficiently diffused.

The beads 4 are approximately spherical transparent particles having a property to permit diffusion of rays of light. Examples of the material which may be used for forming the beads 4 include e.g. acrylic resins, acrylonitrile resins, urethane based resins, vinyl chloride based resins, styrene based resins, polyamide, silicone based resins, fluorine based resins and the like. Among them, acrylic resins having high transparency are preferred, and in particular, polymethyl methacrylate (PMMA) is preferred. Exemplary acrylic resins described above may include acryl-styrene based copolymer resins, acryl-urethane based copolymer resins, acryl-fluorine based copolymer resins, acryl-silicone based copolymer resins and the like.

In the beads 4, small monodisperse beads 4a as a principal component having a comparatively small particle size, and large beads 4b as a sub component having a mean particle size greater than that of the small monodisperse beads 4a are included. The monodisperse beads mean beads having a high uniformity ratio of the particle size. By thus using the small monodisperse beads 4a as a principal component of the beads 4, formation of the light diffusion layer 3 having a great weight ratio of the beads 4 to the binder 5 and a small amount of overlay is enabled by a means such as coating as described later, and in addition, thin and light modeling capability of the light diffusion sheet 1 is promoted. Moreover, by including the large beads 4b as a sub component of the beads 4, protruding parts 6 having a shape of a partial spherical body can be formed on the front face of the light diffusion layer 3 in a scattering manner.

The lower limit of mean height H of the protruding parts 6 is preferably 1 μm, particularly 2 μm, and more particularly 3 μm. To the contrary, the upper limit of the mean height H of the protruding parts 6 is preferably 10 μm, particularly 7 μm, and more particularly 5 μm. When the mean height H of the protruding parts 6 is less than the above lower limit, scratching preventive property of the light diffusion sheet 1 may not be efficaciously achieved which can result from the multiple protruding parts 6 formed on the front face of the light diffusion sheet 1 in a scattering manner. In contrast, when the mean height H of the protruding parts 6 is greater than the above upper limit, optical functions such as light diffusibility exhibited by the small monodisperse beads 4a may be deteriorated, whereby reduction in luminance and lack in uniformity of the luminance may be caused.

The lower limit of mean diameter D of the protruding parts 6 is preferably 4 μm, particularly 8 μm, and more particularly 10 μm. To the contrary, the upper limit of the mean diameter D of the protruding parts 6 is preferably 18 μm, particularly 15 μm, and more particularly 12 μm. When the mean diameter D of the protruding parts 6 is less than the above lower limit, scratching preventive property of the light diffusion sheet 1 front face may not be efficaciously achieved which can result from the protruding parts 6. In contrast, when the mean diameter D of the protruding parts 6 is greater than the above upper limit, optical functions such as light diffusibility exhibited by the small monodisperse beads 4a may be deteriorated, whereby reduction in luminance and lack in uniformity of the luminance may be caused.

The lower limit of mean occupancy rate of the protruding parts 6 is preferably 2%, particularly 2.5%, and more particularly 3.5%. To the contrary, the upper limit of the mean occupancy rate of the protruding parts 6 is preferably 20%, particularly 11%, and more particularly 7%. When the mean occupancy rate of the protruding parts 6 is less than the above lower limit, scratching preventive property of the light diffusion sheet 1 may not be efficaciously achieved which can result from the protruding parts 6. In contrast, when the mean occupancy rate of the protruding parts 6 is greater than the above upper limit, optical functions such as light diffusibility exhibited by the small monodisperse beads 4a may be deteriorated, whereby reduction in luminance and lack in uniformity of the luminance may be caused.

The lower limit of surface roughness (Ra) of the light diffusion layer 3 is preferably 1.5 μm, particularly 3 μm, and more particularly 6 μm. To the contrary, the upper limit of the surface roughness (Ra) of the light diffusion layer 3 is preferably 10 μm. When the surface roughness (Ra) of the light diffusion layer 3 is less than the above lower limit, scratching preventive property of the light diffusion sheet 1 front face may not be efficaciously achieved which can result from the protruding parts 6. In contrast, when the surface roughness (Ra) of the light diffusion layer 3 is greater than the above upper limit, optical functions such as light diffusibility exhibited by the small monodisperse beads 4a may be deteriorated, whereby reduction in luminance and lack in uniformity of the luminance may be caused.

The lower limit of the mean particle size of the small monodisperse beads 4a is preferably 1.5 μm, and particularly preferably 1.8 μm. To the contrary, the upper limit of the mean particle size of the small monodisperse beads 4a is preferably 5 μm, and particularly preferably 4 μm. When the mean particle size of the small monodisperse beads 4a is less than the above lower limit, less recessions and protrusions on the surface of the light diffusion layer 3 formed by the principal component of the beads 4 (small monodisperse beads 4a) are provided, involving the probability of unsatisfactory light diffusing property required for light diffusion sheets. In contrast, when the mean particle size of the small monodisperse beads 4a is greater than the above upper limit, formation of the light diffusion layer 3 having a great weight ratio of the beads 4 to the binder 5 and a small amount of overlay may be difficult, which may lead to occurrence of defects in coating.

Coefficient of variation of particle size distribution of the small monodisperse beads 4a is preferably equal to or less than 0.2, and particularly preferably equal to or less than 0.1. The coefficient of variation of particle size distribution of the small monodisperse beads 4a falling within the aforementioned range may promote facility in forming the light diffusion layer 3 having a great weight ratio of the beads 4a to the binder 5 and a small amount of overlay, whereby the directional light diffusion function of the light diffusion sheet 1 may be promoted.

The lower limit of the mean particle size of the large beads 4b is preferably 3 μm, particularly 5 μm, and more particularly 7 μm. To the contrary, the upper limit of the mean particle size of the large beads 4b is preferably 15 μm, particularly 12 μm, and more particularly 10 μm. When the mean particle size of the large beads 4b is less than the above lower limit, the protruding parts 6 formed on the light diffusion sheet 1 front face may be so small that scratching preventive property of the light diffusion sheet 1 front face may not be efficaciously achieved. In contrast, when the mean particle size of the large beads 4b is greater than the above upper limit, optical functions such as light diffusibility exhibited by the small monodisperse beads 4a may be deteriorated, whereby reduction in luminance and lack in uniformity of the luminance may be caused.

The lower limit of the weight ratio of the small monodisperse beads 4a to the large beads 4b is preferably 6/4, and particularly preferably 8/2. To the contrary, the upper limit of the weight ratio of the small monodisperse beads 4a to the large beads 4b is preferably 9/1. When the weight ratio of the small monodisperse beads 4a to the large beads 4b is less than the above lower limit, optical functions such as light diffusibility exhibited by the small monodisperse beads 4a may be deteriorated, whereby reduction in luminance and lack in uniformity of the luminance may be caused. In contrast, when the weight ratio of the small monodisperse beads 4a to the large beads 4b is greater than the above upper limit, scratching preventive property of the light diffusion sheet 1 front face may not be efficaciously achieved.

As the large beads 4b, monodisperse beads and/or polydisperse beads are used. When the monodisperse beads are used as the large beads 4b, amount of the large beads 4b for forming the protruding parts 6 on the light diffusion layer 3 front face can be reduced, and thus factors which may affect the optical functions such as light diffusibility exhibited by the small monodisperse beads 4a can be minimized. In contrast, when the polydisperse beads are used as the large beads 4b, great particle size distribution can be achieved, whereby continuity of the scratch becomes further invisible.

When the monodisperse beads are used as the large beads 4b, the coefficient of variation of particle size distribution thereof is preferably similar to that of the small monodisperse beads 4a described above. In contrast, when the polydisperse beads are used as the large beads 4b, the coefficient of variation of particle size distribution is preferably 25 or greater and 45 or less, and particularly 30 or greater and 40 or less, particle size distribution width is preferably 1 μm or greater and 30 μm or less, and particularly 3 μm or greater and 25 μm or less.

The weight ratio of the beads 4 to the binder 5 (weight ratio of the beads 4 to the substrate polymer of the binder 5 which is calculated on the basis of the solid content) is preferably 2.5 or greater and 3 or less. When the weight ratio of the beads 4 to the binder 5 is less than the above range, the amount of the overlaid light diffusion layer 3 becomes so small as described later that light diffusibility may be insufficient. In contrast, when the weight ratio of the beads 4 to the binder 5 is beyond the above range, the effect to fix the beads 4 may be impaired, which may lead to occurrence of defects in coating.

The binder 5 can be formed by allowing a polymer composition containing a substrate polymer to be crosslinked and cured. This binder 5 disposes and fixes the beads 4 on the front face of the substrate layer 2 in a manner to provide substantially uniform density. Furthermore, for example, a fine inorganic filler, a curing agent, a plasticizer, a dispersant, any of various levelling agents, an ultraviolet ray-absorbing agent, an anti-oxidizing agent, a viscosity improving agent, a lubricant, a light stabilizer and the like may be blended ad libitum in addition to the substrate polymer in the polymer composition for forming this binder 5.

The aforementioned substrate polymer is not particularly limited, but examples thereof include e.g., acrylic resins, urethane based resins, polyester based resins, fluorine based resins, silicone based resins, polyamide imide, epoxy based resins, ultraviolet-curable resins and the like. One or two or more of these polymers may be used as a mixture. Particularly, a highly processable polyol that can be readily formed into the light diffusion layer 3 by a means such as coating or the like is preferred as the substrate polymer. Furthermore, the substrate polymer per se which may be used for the binder 5 is preferably transparent, and particularly preferably transparent and colorless in light of improvement of the transmittivity of the rays of light.

Examples of the polyol include e.g., polyols obtained by polymerizing a monomer component including a hydroxyl group-containing unsaturated monomer, polyester polyols obtained under a condition with excessive hydroxyl groups present, and the like. These may be used alone or two or more of them may be used as a mixture.

Examples of the hydroxyl group-containing unsaturated monomer include (a) hydroxyl group-containing unsaturated monomers such as e.g., 2-hydroxyethyl acrylate, 2-hydroxypropyl acrylate, 2-hydroxyethyl methacrylate, 2-hydroxypropyl methacrylate, allyl alcohol, homoallyl alcohol, cinnamic alcohol, and crotonyl alcohol, and (b) hydroxyl group-containing unsaturated monomers obtained by a reaction of a dihydric alcohol or an epoxy compound such as e.g., ethylene glycol, ethylene oxide, propylene glycol, propylene oxide, butylene glycol, butylene oxide, 1,4-bis(hydroxymethyl)cyclohexane, phenylglycidyl ether, glycidyl decanoate or PRACCEL FM-1 (manufactured by Daicel Chemical Industries, Ltd.), with an unsaturated carboxylic acid such as e.g., acrylic acid, methacrylic acid, maleic acid, fumaric acid, crotonic acid or itaconic acid. The polyol can be manufactured by polymerizing one or two or more selected from these hydroxyl group-containing unsaturated monomers.

Moreover, the polyol can be also manufactured by polymerizing one or two or more ethylenic unsaturated monomers selected from ethyl acrylate, n-propyl acrylate, isopropyl acrylate, n-butyl acrylate, tert-butyl acrylate, ethylhexyl acrylate, ethyl methacrylate, n-propyl methacrylate, isopropyl methacrylate, n-butyl methacrylate, tert-butyl methacrylate, ethylhexyl methacrylate, glycidyl methacrylate, cyclohexyl methacrylate, styrene, vinyltoluene, 1-methylstyrene, acrylic acid, methacrylic acid, acrylonitrile, vinyl acetate, vinyl propionate, vinyl stearate, allyl acetate, diallyl adipate, diallyl itaconate, diethyl maleate, vinyl chloride, vinylidene chloride, acrylamide, N-methylolacrylamide, N-butoxymethylacrylamide, diacetone acrylamide, ethylene, propylene, isoprene and the like, with the hydroxyl group-containing unsaturated monomer selected from those in the above (a) and (b).

The polymer obtained by polymerizing the monomer component comprising the hydroxyl group-containing unsaturated monomer may have a number average molecular weight of 1000 or greater and 500000 or less, and preferably 5000 or greater and 100000 or less. Furthermore, the hydroxyl value may be 5 or greater and 300 or less, preferably 10 or greater and 200 or less, and more preferably 20 or greater and 150 or less.

The polyester polyol obtained under a condition with excessive hydroxyl groups present can be manufactured by allowing a reaction of (c) a polyhydric alcohol such as e.g., ethylene glycol, diethylene glycol, propylene glycol, dipropylene glycol, 1,3-butanediol, 1,4-butanediol, 1,5-pentanediol, neopentyl glycol, hexamethylene glycol, decamethylene glycol, 2,2,4-trimethyl-1,3-pentanediol, trimethylolpropane, hexanetriol, glycerin, pentaerythritol, cyclohexanediol, hydrogenated bisphenol A, bis(hydroxymethyl)cyclohexane, hydroquinone bis(hydroxyethyl ether), tris(hydroxyethyl)isocyanurate or xylylene glycol with (d) a polybasic acid such as e.g., maleic acid, fumaric acid, succinic acid, adipic acid, sebacic acid, azelaic acid, trimellitic acid, terephthalic acid, phthalic acid or isophthalic acid, under a condition in which number of the hydroxyl groups in the polyhydric alcohol such as propanediol, hexanediol, polyethylene glycol, trimethylolpropane or the like is greater than number of the carboxy groups of the aforementioned polybasic acid.

Number average molecular weight of the polyol obtained under the condition with excessive hydroxyl groups present may be 500 or greater and 300000 or less, and more preferably 2000 or greater and 100000 or less. Additionally, the hydroxyl value may be 5 or greater and 300 or less, preferably 10 or greater and 200 or less, and more preferably 20 or greater and 150 or less.

The polyol for use as the substrate polymer of the polymer composition may be preferably an acryl polyol which is obtained by polymerizing the aforementioned hydroxyl group-containing unsaturated monomer, and which has a (meth)acrylic unit or the like. The binder 5 including the polyester polyol or acryl polyol as the substrate polymer is highly transparent and weather resistant, and yellowing of the light diffusion layer 3 and the like can be suppressed. In particular, use of the acryl polyol as the substrate polymer, and use of the acrylic resin beads 4 will reduce unwanted refraction, reflection and the like at the interface of the beads 4. Thus, the optical functions such as the directional light diffusion function, transmittivity of rays of light and the like of the light diffusion sheet 1 can be improved. Either one of this polyester polyol or the acryl polyol may be used, alternatively, both of them may be used.

Number of the hydroxyl groups in the polyester polyol and the acryl polyol is not particularly limited as long as it is two or more per molecule, however, when the hydroxyl value in the solid content is equal to or less than 10, crosslinking points may be reduced and thus, film physical properties such as solvent resistance, water resistance, heat resistance, surface hardness and the like are liable to be decreased.

The lower limit of the amount of the overlaid light diffusion layer 3 may be preferably 3 g/m$^2$, and particularly preferably 5 g/m$^2$. To the contrary, the upper limit of the amount of the overlaid light diffusion layer 3 may be preferably 10 g/m$^2$, and particularly preferably 8 g/m$^2$. By setting the amount of the overlaid light diffusion layer 3 to fall within the above range, in addition to the use of the small monodisperse beads 4a with a comparatively small particle size as the principal component of the beads 4 as described above and setting of the weight ratio of the beads 4 to the binder 5 being comparatively great, the beads 4 can be laid to spread over the front face of the substrate layer 2 in a comparatively compact and uniform manner, thereby capable of forming fine protrusions on the front face of the light diffusion layer 3 in a comparatively compact and uniform manner. Consequently, the optical functions such as a directional light diffusion function, transmittivity of rays of light and the like of the light diffusion sheet 1 can be improved.

According to the light diffusion sheet 1, the small monodisperse beads 4a with uniform particle size can be laid to spread over the front face of the substrate layer 2 in a comparatively compact and uniform manner, thereby capable of forming protrusions that are fine and have uniform height on the front face in a comparatively compact and uniform manner by using the small monodisperse beads 4a with a small particle size, setting the weight ratio of the beads to the binder to be great, and setting the amount of the overlaid light diffusion layer 3 to be small as described above. Owing to such refraction action and the like at the fine recessions and protrusions on the front face of the light diffusion layer 3, the light diffusion sheet 1 has a favorable directional light diffusion function, transmittivity of rays of light and the like, thereby capable of promoting the economic efficiency and thin film character. Moreover, the light diffusion sheet 1 has protruding parts 6 having a shape of a partial spherical body on the front face of the light diffusion layer 3 in a scattering manner through including the large beads 4b as a sub component of the beads 4, therefore, possibility of scratching of the front face is reduced, and generation of a continuous scratch can be prevented even though the front face is scratched. Hence, according to the light diffusion sheet 1, generation of continuous scratches on the front face can be reduced in the steps of the production and assembly of LCD, whereby reduction of the process yield of the product can be prevented.

In the light diffusion sheet 1, it is most suitable that: an acrylic resin be used as the substrate polymer of the beads 4 and the binder 5; mean particle size of the small monodisperse beads 4a be 3 μm; the weight ratio of the beads 4 to the binder 5 be 2.7; and the amount of the overlaid light diffusion layer 3 be 6 g/m$^2$. Accordingly, the directional light diffusion function, transmittivity of rays of light, economic efficiency, thin film character and the like of the light diffusion sheet 1 can be efficiently improved.

A fine inorganic filler may be included in the polymer composition that forms the binder 5. By thus including a fine inorganic filler in the binder 5, the heat resistance of the light diffusion layer 3, and in turn, of the light diffusion sheet 1 may be improved. Inorganic matter that constitutes this fine inorganic filler is not particularly limited, but inorganic oxides are preferred. This inorganic oxide is defined as any one of a variety of oxygen-containing metal compounds in which a metal element forms a three dimensional network predominantly via bonds with an oxygen atom. The metal element that constitutes the inorganic oxide is preferably an element selected from, for example, the group II-VI in a periodic table of the elements, and more preferably an element selected from the group III-V in periodic table of the elements. Particularly, an element selected from Si, Al, Ti and Zr is preferred. Colloidal silica in which the metal element is Si is most preferred as the fine inorganic filler in terms of the effect to improve the heat resistance and uniform dispersibility. Also, the shape of the fine inorganic filler is not particularly limited, but may be any optional particle shape such as spherical, needle-like, plate-like, squamous, granular or the like.

The lower limit of the mean particle size of the fine inorganic filler is preferably 5 nm, and particularly preferably 10 nm. To the contrary, the upper limit of the mean particle size of the fine inorganic filler is preferably 50 nm, and particularly preferably 25 nm. When the mean particle size of the fine inorganic filler is less than the range described above, surface energy of the fine inorganic filler becomes so high that aggregation or the like may be liable to occur. In contrast, the mean particle size of the fine inorganic filler being greater than the range described above may cause white turbidity due to the influences of the short-wavelength, leading to failure in completely maintaining the transparency of the light diffusion sheet 1.

The lower limit of the weight ratio of the fine inorganic filler (weight ratio of the inorganic substance component alone per 100 parts by weight of the substrate polymer of the binder 5) is preferably 5 parts, and particularly preferably 50 parts calculated on the basis of the solid content. To the contrary, the upper limit of the weight ratio of the fine inorganic filler is preferably 500 parts, more preferably 200 parts, and particularly preferably 100 parts. When the weight ratio of the fine inorganic filler is less than the above range, the light diffusion sheet 1 may not develop heat resistance enough, in contrast, when the weight ratio is beyond the above range, blending in the polymer composition may be difficult, which may result in lowering of the transmittance of the rays of light of the light diffusion layer 3.

As the fine inorganic filler, one having an organic polymer fixed on the surface thereof may be used. By thus using the organic polymer-fixed fine inorganic filler, dispersibility in the binder 5 and improvement of affinity with the binder 5 may be contemplated. This organic polymer is not particularly limited with respect to the molecular weight, shape, composition, presence of the functional group and the like, but an arbitrary organic polymer may be used. Furthermore, in connection with the shape of the organic polymer, any arbitrary shape such as a straight, branched or crosslinked structure may be used.

Specific examples of the resin constituting the organic polymer include e.g., (meth)acrylic resins, polystyrene, polyvinyl acetate, polyolefin such as polyethylene and polypropylene, polyvinyl chloride, polyvinylidene chloride, polyesters such as polyethylene terephthalate, copolymers of the same as well as these resins partially modified with a functional group such as an amino group, an epoxy group, a hydroxyl group or a carboxyl group, or the like. Among them, those including an organic polymer which contains a (meth) acrylic unit such as a (meth)acrylic resin, a (meth)acrylstyrene based resin or a (meth)acryl-polyester based resin as an essential component are suited because of their film formation ability. On the other hand, resins having miscibility with the substrate polymer of the aforementioned polymer composition are preferred, therefore, that having the same composition as the substrate polymer included in the polymer composition is most preferred.

The fine inorganic filler may include an organic polymer within the fine particle. Accordingly, adequate softness and toughness can be imparted to the inorganic substance that is a core of the fine inorganic filler.

As the organic polymer, those containing an alkoxy group may be preferably used, with the content of the same being 0.01 mmol or greater and 50 mmol or less per gram of the fine inorganic filler to which the organic polymer was fixed. Such an alkoxy group can improve affinity with a matrix resin that constitutes the binder 5, and dispersibility in the binder 5.

The alkoxy group described above means an RO group bound to a metal element that forms the skeleton of the fine particle. R herein represents an alkyl group which may be substituted, and the RO group in the fine particle may be the same or different. Specific examples of R include methyl, ethyl, n-propyl, isopropyl, n-butyl and the like. It is preferred that a metal alkoxy group be used which comprises the same metal as that constituting the fine inorganic filler. When the fine inorganic filler is colloidal silica, an alkoxy group including silicon as the metal may be preferably used.

Although percentage content of the organic polymer in the fine inorganic filler to which the organic polymer was fixed is not particularly limited, the content thereof is preferably equal to or greater than 0.5% by weight and equal to or less than 50% by weight based on the fine organic filler.

It is preferred that an organic polymer having a hydroxyl group is used as the organic polymer to be fixed on the fine inorganic filler, and that at least one selected from polyfunctional isocyanate compounds having two or more functional groups that react with a hydroxyl group, melamine compounds and aminoplast resins is included in the polymer composition that constitutes the binder 5. Accordingly, the fine inorganic filler and the matrix resin of the binder 5 are bound via a crosslinking structure, leading to excellent stability upon preservation, stain resistance, flexibility, weather resistance and the like. Furthermore, the resulting coated film can be glossy.

As the substrate polymer of the binder 5, a polyol having a cycloalkyl group is preferred. By thus introducing a cycloalkyl group into the polyol as the substrate polymer constituting the binder 5, hydrophobicity of the binder 5 may be elevated to improve water repellency, water resistance and the like. Accordingly, deflection resistance, size stability and the like of the light diffusion sheet 1 under high temperature and high humidity conditions can be improved. Additionally, basic film coating performances such as weather resistance, hardness, bulky feeling, solvent resistance and the like of the light diffusion layer 3 may be improved. Moreover, affinity with the fine inorganic filler to which the organic polymer was fixed on the surface thereof, and uniform dispersibility of the fine inorganic filler may be further favorable.

The cycloalkyl group is not particularly limited, but examples thereof include e.g., cyclobutyl groups, cyclopentyl groups, cyclohexyl groups, cycloheptyl groups, cyclooctyl groups, cyclononyl groups, cyclodecyl groups, cycloundecyl groups, cyclododecyl groups, cyclotridecyl groups, cyclotetradecyl groups, cyclopentadecyl groups, cyclohexadecyl groups, cycloheptadecyl groups, cyclooctadecyl groups and the like.

The polyol having the cycloalkyl group is obtained by copolymerization of a polymerizable unsaturated monomer having a cycloalkyl group. Such a polymerizable unsaturated monomer having a cycloalkyl group is a polymerizable unsaturated monomer having at least one cycloalkyl group within the molecule. This polymerizable unsaturated monomer is not particularly limited, but examples thereof include e.g., cyclohexyl(meth)acrylate, methylcyclohexyl(meth)acrylate, tert-butylcyclohexyl(meth)acrylate, cyclododecyl(meth)acrylate and the like.

Also, isocyanate may be included as a curing agent in the polymer composition. By thus including an isocyanate curing agent in the polymer composition, even more rigid crosslinking structure is provided, thereby further improving the physical film properties of the light diffusion layer 3. Similar substance to the polyfunctional isocyanate compounds as described above may be used as the isocyanate. Among them, aliphatic isocyanate is preferred which prevents the coated film from yellowing.

Particularly, when the polyol is used as the substrate polymer, any one of hexamethylene diisocyanate, isophorone diisocyanate and xylene diisocyanate, or two or more thereof as a mixture may be used as the curing agent to be blended in the polymer composition. When such a curing agent is used, velocity of the curing reaction of the polymer composition is elevated, therefore, lowering of the velocity of the curing reaction due to the cationic antistatic agent can be sufficiently compensated even though a cationic substance that is responsible for dispersion stability of the fine inorganic filler is used as the antistatic agent. Also, elevation of the velocity of the curing reaction of the polymer composition is responsible for uniform dispersibility of the fine inorganic filler in the binder. As a consequence, the light diffusion sheet 1 can markedly suppress deflection and yellowing due to heat, ultraviolet ray and the like.

Furthermore, an antistatic agent may be included in the aforementioned polymer composition. Through forming a binder 5 from the polymer composition mixed with the antistatic agent in such a manner, the light diffusion sheet 1 exerts an antistatic effect, thereby enabling the prevention of disadvantages resulting from electrostatic charge such as attraction of dust, getting into a difficulty in overlaying with a prism sheet or the like, and the like. Furthermore, although coating the antistatic agent on a surface results in stickiness or pollution of the surface, such negative effects may be reduced by mixing it in the polymer composition. This antistatic agent is not particularly limited, but examples of the antistatic agents which may be used include e.g., anionic antistatic agents such as alkyl sulfate, alkyl phosphate and the like; cationic antistatic agents such as quaternary ammonium salts, imidazoline compounds and the like; nonionic antistatic agents such as polyethyleneglycol based compounds, polyoxyethylene sorbitan monostearate esters, ethanol amides and the like; polymeric antistatic agents such as polyacrylic acid and the like; ion conductive antistatic agents and the like. Among them, cationic antistatic agents are preferred having comparatively strong antistatic effects, and may exert an anti-static effect by merely adding in a small amount.

Moreover, an ultraviolet ray-absorbing agent may be included in the polymer composition. By forming the binder 5 from the polymer composition thus containing the ultraviolet ray-absorbing agent, an ultraviolet protection function may be imparted to the light diffusion sheet 1, thereby protecting a slight amount of an ultraviolet ray emitted from the lamp of the backlight unit. Accordingly, disruption of the liquid crystal layer due to the ultraviolet ray can be prevented.

The ultraviolet ray-absorbing agent is not particularly limited, but any known one may be used as long as it absorbs an ultraviolet ray and efficiently converts it into heat energy, and is a compound that is stable to the light. Among them, salicylic acid based ultraviolet ray-absorbing agents, benzophenone based ultraviolet ray-absorbing agents, benzotriazole based ultraviolet ray-absorbing agents and cyano acrylate based ultraviolet ray-absorbing agents are preferred which have high ultraviolet ray-absorbing function and favorable miscibility with the aforementioned substrate polymer, and can be stably present in the substrate polymer. One or two or more agents selected from these groups may be used. Also, as the ultraviolet ray-absorbing agent, a polymer having an ultraviolet ray-absorbing group in the molecular chain (for example, "UW UV" series of NIPPON SHOKUBAI Co., Ltd., and the like) may be suitably used. According to the use of such a polymer having an ultraviolet ray-absorbing group in the molecular chain, high miscibility with the main polymer of the binder 5 may be achieved, and deterioration of the ultraviolet ray-absorbing function caused by bleeding out of the ultraviolet ray-absorbing agent can be prevented. Also, a polymer having an ultraviolet ray-absorbing group in the molecular chain can be used as the substrate polymer of the binder 5. Additionally, using the polymer to which the ultraviolet ray-absorbing group was bound as the substrate polymer of the binder 5, and including an ultraviolet ray-absorbing agent in this substrate polymer may be also permitted, thereby capable of further improving the ultraviolet ray-absorbing function.

The lower limit of the content of the ultraviolet ray-absorbing agent to the substrate polymer of the binder 5 is preferably 0.1% by weight, more preferably 1% by weight, and still more preferably 3% by weight, while the upper limit of the content of the ultraviolet ray-absorbing agent is preferably 10% by weight, more preferably 8% by weight, and still more preferably 5% by weight. When the weight ratio of the ultraviolet ray-absorbing agent to the substrate polymer is less than the above lower limit, the ultraviolet ray-absorbing function of the light diffusion sheet 1 may not be efficaciously achieved, in contrast, when the weight ratio of the ultraviolet ray-absorbing agent is greater than the above upper limit, deleterious influence may be exerted on the substrate polymer, which may lead to reduction in the strength, durability and the like of the binder 5.

In place of the ultraviolet ray-absorbing agent or together with the ultraviolet ray-absorbing agent, an ultraviolet ray-stabilizing agent (including substrate polymer having an ultraviolet ray-stabilizing group bound to the molecular chain) can be also used. This ultraviolet ray-stabilizing agent may inactivate the radical, active oxygen and the like generated by the ultraviolet ray, thereby capable of improving the ultraviolet ray stability, weather resistance and the like. As this ultraviolet ray-stabilizing agent, a hindered amine based ultraviolet ray-stabilizing agent that is highly stable to ultraviolet rays may be suitably used. Also, use of the ultraviolet ray-absorbing agent and the ultraviolet ray-stabilizing agent in combination markedly improves prevention of deterioration due to the ultraviolet rays and weather resistance.

Next, the process for producing the light diffusion sheet 1 will be explained below. The process for producing the light diffusion sheet 1 includes: (a) a step of preparing a polymer composition for a light diffusion layer through admixing beads 4 with a polymer composition that constitutes a binder 5; and (b) a step of overlaying and curing the polymer composition for a light diffusion layer on a front face of a substrate layer 2 to form a light diffusion layer 3.

The means for overlaying the polymer composition for the light diffusion layer is not particularly limited, but any of various known methods may be employed. Specific means for overlaying which may be employed involves coating in which e.g., a gravure coating method, a roll coating method, a bar coating method, a blade coating method, a spray coating method or the like is used. Among all, a gravure coating method which enables the polymer composition having a great weight ratio of the beads 4 to be coated to give a thin and even film is most preferred. In such a gravure coating method, taking into consideration of the formation performance of the light diffusion layer 3, number of lines of the gravure may be 70 or greater and 100 or less, and the rotation number may be preferably 80 or greater and 120 or less.

Figure 2:
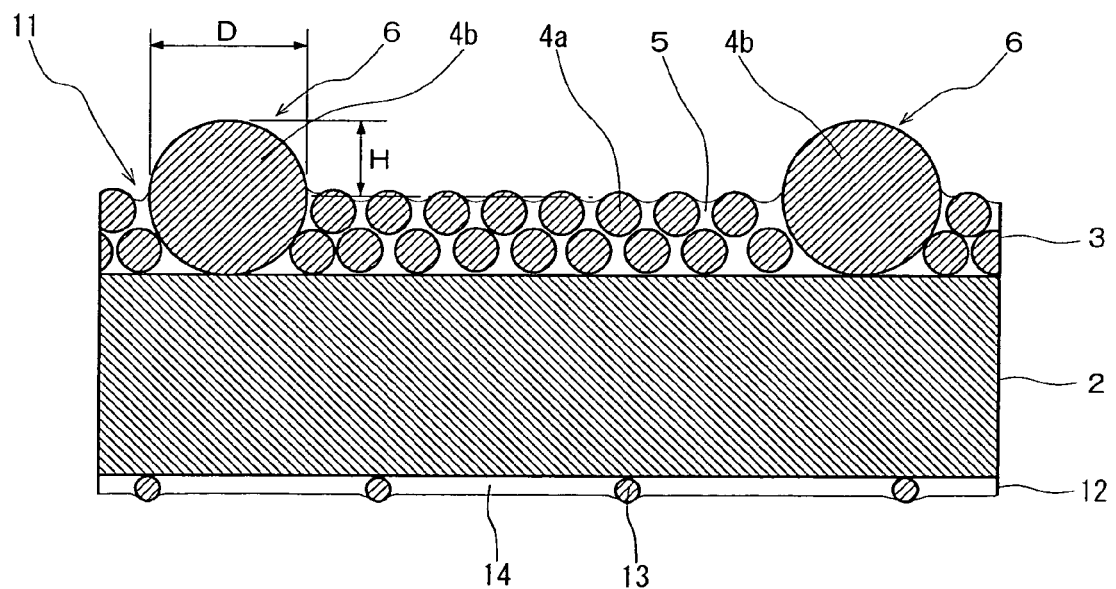
FIG. 2 shows a schematic cross sectional view illustrating a light diffusion sheet according to an embodiment that is different from the light diffusion sheet shown in FIG. 1.

A light diffusion sheet 11 illustrated in FIG. 2 has a substrate layer 2, a light diffusion layer 3 overlaid on the front face of this substrate layer 2, and a sticking preventive layer 12 overlaid on the back face of this substrate layer 2. Because the substrate layer 2 and the light diffusion layer 3 are similar to those in the light diffusion sheet 1 shown in FIG. 1 as described above, explanation thereof is omitted by way of assigning the identical numeric number.

The sticking preventive layer 12 includes beads 13 disposed on the back face of the substrate layer 2, and a binder 14 that fixes the beads 13. This binder 14 is also formed by crosslinking and curing a polymer composition which is similar to that for the binder 5 of the light diffusion layer 3 as described above. Moreover, as the material for the beads 13, similar ones to the beads 4 for the light diffusion layer 3 may be used. In addition, the thickness of the sticking preventive layer 12 (the thickness of the binder 14 portion, at a part where the beads 13 are not present) is not particularly limited, however for example, it is set to be around 1 μm or greater and 10 μm or less.

The weight ratio of the beads 13 is set to be relatively small. The beads 13 are dispersed in the binder 14 spacing apart with each other. In addition, a small bottom part of many of the beads 13 may be protruded from the mean interface of the binder 14 to form protrusions on the back face of the sticking preventive layer 12. Thus, when this light diffusion sheet 11 is disposed to overlay the optical waveguide plate, the protrusions formed by the beads 13 are brought into contact with the surface of the optical waveguide plate or the like in a scattering manner, and thus the entire surface of the back face of the light diffusion sheet 11 is not brought into contact with the optical waveguide plate or the like. Sticking between the light diffusion sheet 11 and the optical waveguide plate is thereby prevented, leading to suppression of the lack in uniformity of the luminance of the window of a liquid crystal display device.

Next, the process for producing the light diffusion sheet 11 will be explained below. The process for producing the light diffusion sheet 11 includes: (a) a step of preparing a polymer composition for a light diffusion layer through admixing beads 4 with a polymer composition that constitutes a binder 5; (b) a step of overlaying and curing the polymer composition for a light diffusion layer on a front face of a substrate layer 2 to form a light diffusion layer 3; (c) a step of preparing a polymer composition for a sticking preventive layer through admixing beads 13 with a polymer composition that constitutes a binder 13; and (d) a step of overlaying and curing the polymer composition for a sticking preventive layer on the back face of the substrate layer 2 to overlay a sticking preventive layer 12. Means for overlaying the polymer composition for a light diffusion layer and the polymer composition for a sticking preventive layer on the substrate layer 2 is not particularly limited, but, for example, coating in which a bar coater, a blade coater, a spin coater, a roll coater, a gravure coater, a flow coater, a spray or the like is used may be employed.

The light diffusion sheet 11 can form, similarly to the light diffusion sheet 1 as described above, protrusions that are fine and have uniform height in a comparatively compact and uniform manner on the front face. Consequently, it has a favorable directional light diffusion function, transmittivity of rays of light and the like, and can promote the economic efficiency and thin film characters. In addition, the light diffusion sheet 11 has, similarly to the light diffusion sheet 1 described above, the protruding parts 6 having a shape of a partial spherical body on the front face of the light diffusion layer 3 in a scattering manner, therefore, it has a scratching preventive property on the front face, whereby reduction of the process yield of the product can be prevented.

Therefore, in a backlight unit for use in a liquid crystal display device, which is equipped with a lamp, an optical waveguide plate, a light diffusion sheet, a prism sheet and the like, where rays of light emitted from the lamp are diffused to lead to the front face side, when the light diffusion sheet 1 or 11 is used as a light diffusion sheet, qualities such as face luminance, uniformity of the luminance and the like can be improved owing to its high directional light diffusion function, transmittivity of rays of light, thin film character, economic efficiency and the like as described above, and additionally, reduction in cost, and thin and light modeling capability can be promoted which have been presently desired in social aspects. In addition, because the light diffusion sheet 1 or 11 has an excellent scratching preventive property, cost reduction capability and thin film character in the backlight unit as described above, reduction in cost, and thin and light modeling capability can be promoted which have been presently desired in social aspects.

The light diffusion sheet of the present invention is not limited to the foregoing embodiments. For example, a variety of modes in which protruding parts having a shape of a partial spherical body on the front face of the light diffusion layer in a scattering manner may be employed. Specifically, means for forming the protruding parts on the light diffusion layer front face by incorporating a filler other than the beads into the light diffusion layer, means for forming the protruding parts by transcription using a sheet pattern, and the like may be employed. Moreover, other layers such as an ultraviolet ray-absorbing agent layer, top coat layer and the like may be also overlaid on the light diffusion sheet.

In connection with the ultraviolet ray-absorbing agent, in place of or together with the aforementioned means for incorporating into the binder of the light diffusion layer, it is also possible to overlay the ultraviolet ray-absorbing layer including an ultraviolet ray-absorbing agent can be also overlaid, alternatively, the ultraviolet ray-absorbing agent can be also included in the binder of the sticking preventive layer or in the substrate layer. Also by these means, protection of the backlight unit from the ultraviolet ray emitted from the lamp can be similarly executed, and disruption of the liquid crystal layer due to the ultraviolet ray can be prevented.

With respect to the antistatic agent, in place of or together with the aforementioned means for incorporating into the binder of the light diffusion layer, an antistatic layer including an antistatic agent can be also overlaid, and the antistatic agent can be also included in the binder of the sticking preventive layer or in the substrate layer. Also by these means, the antistatic effect may be developed to the light diffusion sheet, therefore, occurrence of disadvantages caused due to electrification, such as collecting dusts with friction, difficulties in overlaying with other sheet such as a prism sheet or the like can be prevented.

EXAMPLES

The present invention will be explained in detail below with reference to Examples, however, the present invention should not be construed as being limited to the description of the Examples.

Comparative Example

A transparent polyethylene terephthalate film having a thickness of 100 μm was used as a substrate layer. A polymer composition comprising 32 parts of an acryl polyol (substrate polymer), 86 parts of beads made of an acrylic resin, 6 parts of an isocyanate based curing agent, 3 parts of an antistatic agent and a solvent was used as a polymer composition for a light diffusion layer. Number of the parts representing the amount of each component means the weight ratio calculated on the basis of the solid content. As the beads, only small monodisperse beads having a mean particle size of 3 μm and a coefficient of variation of 0.1 were used. A light diffusion sheet of Comparative Example was obtained by laminating the polymer composition for a light diffusion layer on the front face of the substrate layer in an amount of 6 g/m$^2$ (calculated on the basis of the solid content) by a gravure coating method.

Example 1

A light diffusion sheet of Example 1 was obtained in a similar manner to the above Comparative Example except that the small monodisperse beads and large beads were used as the beads after mixing. The used large beads were polydisperse beads having a mean particle size of 8.6 μm, a coefficient of variation of 33.5, and a particle size distribution width of 3.2 μm or greater and 23.8 μm or less. The weight ratio of the small monodisperse beads to the large beads was 95/5.

Example 2

A light diffusion sheet of Example 2 was obtained in a similar manner to the above Comparative Example except that the small monodisperse beads and large beads were used as the beads after mixing. The used large beads were polydisperse beads having a mean particle size of 8.6 μm, a coefficient of variation of 33.5, and a particle size distribution width of 3.2 μm or greater and 23.8 μm or less. The weight ratio of the small monodisperse beads to the large beads was 9/1.

Example 3

A light diffusion sheet of Example 3 was obtained in a similar manner to the above Comparative Example except that the small monodisperse beads and large beads were used as the beads after mixing. The used large beads were polydisperse beads having a mean particle size of 8.6 μm, a coefficient of variation of 33.5, and a particle size distribution width of 3.2 μm or greater and 23.8 μm or less. The weight ratio of the small monodisperse beads to the large beads was 8/2.

Example 4

A light diffusion sheet of Example 4 was obtained in a similar manner to the above Comparative Example except that the small monodisperse beads and large beads were used as the beads after mixing. The used large beads were polydisperse beads having a mean particle size of 8.6 μm, a coefficient of variation of 33.5, and a particle size distribution width of 3.2 μm or greater and 23.8 μm or less. The weight ratio of the small monodisperse beads to the large beads was 7/3.

Example 5

A light diffusion sheet of Example 5 was obtained in a similar manner to the above Comparative Example except that the small monodisperse beads and large beads were used as the beads after mixing. The used large beads were polydisperse beads having a mean particle size of 8.6 μm, a coefficient of variation of 33.5, and a particle size distribution width of 3.2 μm or greater and 23.8 μm or less. The weight ratio of the small monodisperse beads to the large beads was 6/4.

Example 6

A light diffusion sheet of Example 6 was obtained in a similar manner to the above Comparative Example except that the small monodisperse beads and large beads were used as the beads after mixing. The used large beads were polydisperse beads having a mean particle size of 8.6 μm, a coefficient of variation of 33.5, and a particle size distribution width of 3.2 μm or greater and 23.8 μm or less. The weight ratio of the small monodisperse beads to the large beads was 5/5.

Example 7

A light diffusion sheet of Example 7 was obtained in a similar manner to the above Comparative Example except that the small monodisperse beads and large beads were used as the beads after mixing. The used large beads were monodisperse beads having a mean particle size of 8 μm. The weight ratio of the small monodisperse beads to the large beads was 95/5.

Example 8

A light diffusion sheet of Example 8 was obtained in a similar manner to the above Comparative Example except that the small monodisperse beads and large beads were used as the beads after mixing. The used large beads were monodisperse beads having a mean particle size of 8 μm. The weight ratio of the small monodisperse beads to the large beads was 9/1.

Example 9

A light diffusion sheet of Example 9 was obtained in a similar manner to the above Comparative Example except that the small monodisperse beads and large beads were used as the beads after mixing. The used large beads were monodisperse beads having a mean particle size of 8 μm. The weight ratio of the small monodisperse beads to the large beads was 8/2.

Example 10

A light diffusion sheet of Example 10 was obtained in a similar manner to the above Comparative Example except that the small monodisperse beads and large beads were used as the beads after mixing. The used large beads were monodisperse beads having a mean particle size of 8 µm. The weight ration of the small monodisperse beads to the large beads was 7/3.

Example 11

A light diffusion sheet of Example 11 was obtained in a similar manner to the above Comparative Example except that the small monodisperse beads and large beads were used as the beads after mixing. The used large beads were monodisperse beads having a mean particle size of 8 µm. The weight ratio of the small monodisperse beads to the large beads was 6/4.

Example 12

A light diffusion sheet of Example 12 was obtained in a similar manner to the above Comparative Example except that the small monodisperse beads and large beads were used as the beads after mixing. The used large beads were monodisperse beads having a mean particle size of 8 µm. The weight ratio of the small monodisperse beads to the large beads was 5/5.

[Evaluation of Characteristics]

Using the light diffusion sheets of Examples 1 to 12, and the light diffusion sheet of Comparative Example described above, the mean height H of the protruding parts, the mean diameter D of the protruding parts, the mean occupancy rate of the protruding parts and the surface roughness (Ra) in these light diffusion sheets were determined. Furthermore, these light diffusion sheets were integrated in the edge light type and immediate beneath type backlight units in effect, respectively, and relative values of the face luminance were measured. Moreover scratching preventive property of the front face of these light diffusion sheets was evaluated. The results are shown in Table 1 below.

The scratching preventive property was evaluated by visual observation in the test carried out according to JIS-L-0849 "Test methods for colour fastness to rubbing" based on the following criteria:
A: scratches being almost absent;
B: scratches being negligible; and
C: scratches being remarkable.

As shown in Table 1 above, the light diffusion sheets of Examples 1 to 12 exhibited favorable scratching preventive property as compared with the light diffusion sheet of Comparative Example in which only the small monodisperse beads were used, and those light diffusion sheets exhibited nearly equal relative values of the face luminance. Furthermore, upon comparison of the light diffusion sheets of Examples 1 to 12, the light diffusion sheets of Examples 2 to 5 and 8 to 11 in which the weight ratio of the small monodisperse beads to the large beads is 6/4 or greater and 9/1 or less were favorable in terms of both face luminance and scratching preventive property. In particular, the light diffusion sheets of Examples 2, 3, 8 and 9 in which the weight ratio is 8/2 or greater and 9/1 or less exhibited high face luminance and excellent scratching preventive property.

Figure 3:
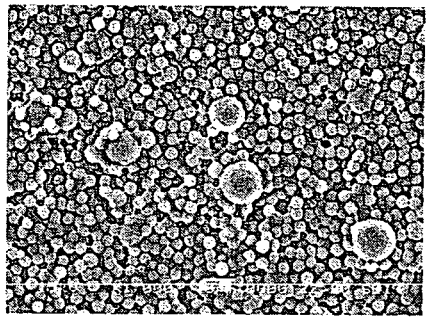
FIG. 3(a) shows a magnified photograph of a light diffusion sheet according to Example 3 taken by an electron microscope.
FIG. 3(b) shows a magnified photograph of a light diffusion sheet according to Comparative Example taken by an electron microscope.
Figure 3:
Figure 3:
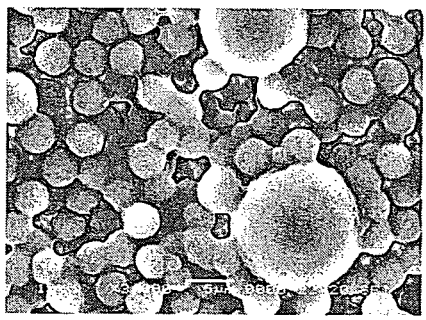
Figure 3:
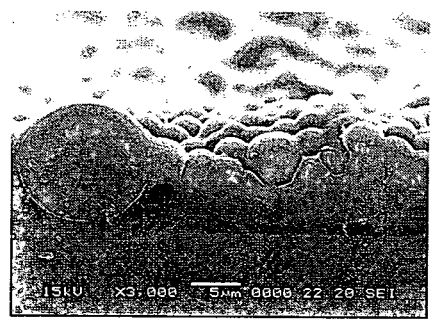
Figure 3:
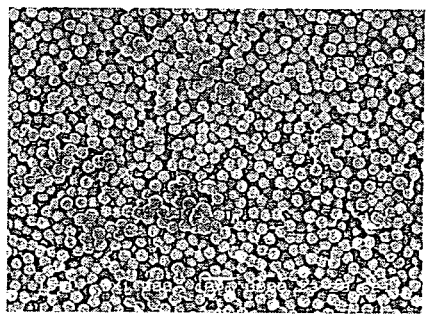
Figure 3:
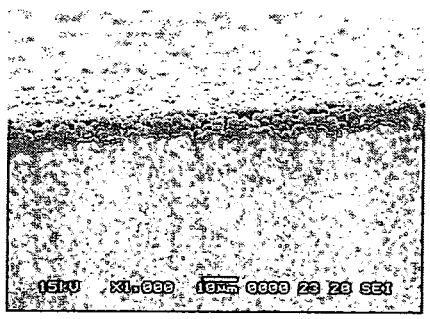
Figure 3:
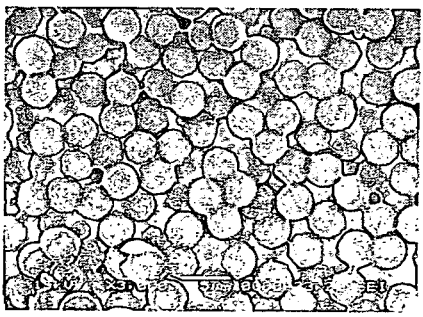
Figure 3:
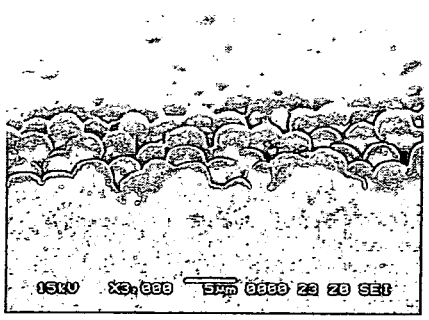
Figure 4:
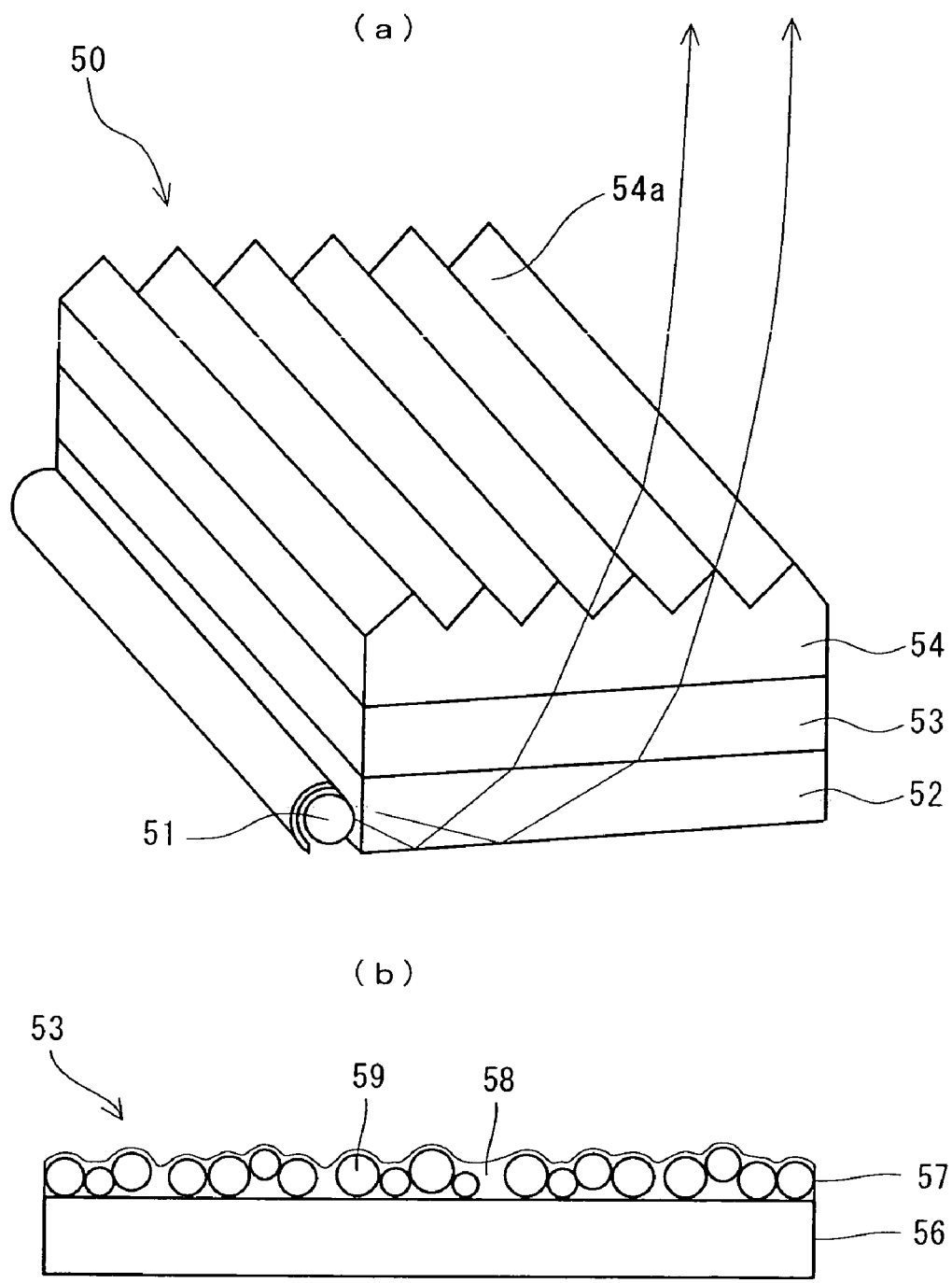
FIG. 4(a) is a schematic perspective view illustrating a common backlight unit of an edge light type.
FIG. 4(b) is a schematic cross sectional view illustrating a common light diffusion sheet.

Also, when electron microscopic magnified photographs of the light diffusion sheet of Examples 3 shown in FIG. 3A and the light diffusion sheet of Comparative Example shown in FIG. 3B are confronted, it is revealed that the light diffusion sheet of Comparative Example had no protruding part on the front face, while protruding parts are present on the front face of the light diffusion sheet of Example 3 in a scattering manner.

What is claimed is:
1. A light diffusion sheet comprising a transparent substrate layer, and a light diffusion layer overlaid on the front face side of the substrate layer, wherein
the light diffusion layer has resin beads and a resin binder,
the light diffusion layer has protruding parts having a shape of a partial spherical body on the front face in a scattering manner,
the resin beads including small monodisperse beads as a principal component, and large monodisperse beads, having a particle size greater than the small monodisperse beads, as a subcomponent,
the mean particle size of the small monodisperse beads being 1.5 µm to 5 µm,
the weight ratio of the resin beads to the binder being 2.5 to 3.0,
the amount of the overlaid light diffusion layer being 3 g/m$^2$ to 10 g/m$^2$,
the mean particle size of the large beads being 3 µm to 15 µm,

TABLE 1

Results of Determination on Protruding Parts, and Evaluation on Relative Luminance, Scratching Preventive Property

| | Weight ratio (small diameter B/ large diameter B) | Mean height H of protruding parts (µm) | Mean diameter D of protruding parts (µm) | Mean occupancy rate of protruding parts (%) | Surface roughness (Ra) | Evaluation on scratching preventive property | Face luminance relative value | |
|---|---|---|---|---|---|---|---|---|
| | | | | | | | Edge light type | Immediate beneath type |
| Comparative Example | 100/0 | — | — | — | 1.2 | C | 100 | 100 |
| Example 1 | 95/5 | 4.67 | 12.84 | 0.97 | 1.8 | B | 87 | 89 |
| Example 2 | 9/1 | 4.29 | 11.20 | 2.67 | 9.4 | A | 100 | 100 |
| Example 3 | 8/2 | 4.90 | 11.04 | 3.69 | 6.5 | A | 100 | 100 |
| Example 4 | 7/3 | 4.81 | 11.46 | 4.99 | 5.1 | A | 98 | 99 |
| Example 5 | 6/4 | 4.79 | 11.29 | 6.96 | 3.1 | A | 98 | 99 |
| Example 6 | 5/5 | 4.80 | 11.34 | 8.26 | 2.3 | A | 94 | 94 |
| Example 7 | 95/5 | 1.87 | 5.42 | 1.48 | 1.5 | B | 98 | 98 |
| Example 8 | 9/1 | 2.40 | 5.94 | 4.65 | 1.6 | A | 99 | 99 |
| Example 9 | 8/2 | 2.22 | 5.97 | 7.09 | 1.8 | A | 100 | 100 |
| Example 10 | 7/3 | 1.95 | 6.78 | 19.34 | 1.5 | B | 100 | 100 |
| Example 11 | 6/4 | 2.19 | 4.58 | 11.06 | 1.7 | B | 100 | 100 |
| Example 12 | 5/5 | 2.15 | 6.51 | 27.90 | 2.7 | B | 99 | 99 | the weight ratio of the small monodisperse beads to the large monodisperse beads being 6/4 to 9/1,
the coefficient of variation of particle size distribution of the small monodisperse beads is 0.2 or less, and
the mean occupancy rate of the protruding parts is 2% to 20%,
the mean height of the protruding parts is 1 μm or greater and 10 μm or less, and
the mean diameter of the protruding parts is 4 μm or greater and 18 μm or less.

2. The light diffusion sheet according to claim 1 wherein surface roughness (Ra) of the light diffusion layer is 1.5 μm or greater and 10 μm or less.

3. The light diffusion sheet according to claim 1 wherein both the resin beads and the resin binder are made of an acrylic resin.

4. The light diffusion sheet according to claim 1 which further comprises a sticking preventive layer overlaid on the back face side of the substrate, wherein the sticking preventive layer has beads dispersed in a binder.

5. A backlight unit for use in a liquid crystal display device in which rays of light emitted from a lamp are diffused to lead to the front face side, the backlight unit having the light diffusion sheet according to claim 1.

* * * * *